July 26, 1960
O. W. DOPHEIDE
2,946,949
DEVICE FOR TESTING CONTINUITY AND CAPACITANCE OF CIRCUIT ELEMENTS
Filed Feb. 4, 1957
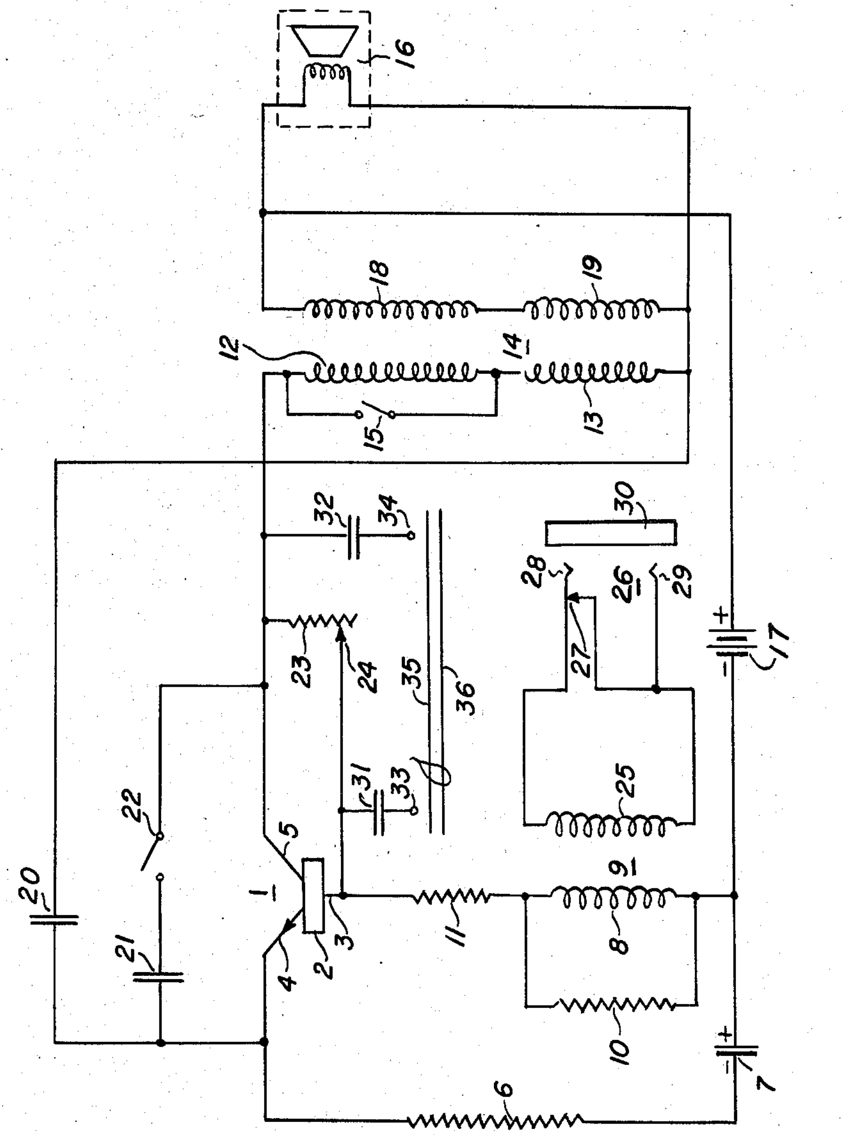
Inventor
Otto Walter Dopheide
By Robert B. Harmon
Attorney United States Patent Office 2,946,949
Patented July 26, 1960

2,946,949

DEVICE FOR TESTING CONTINUITY AND CAPACITANCE OF CIRCUIT ELEMENTS

Otto Walter Dopheide, Longueuil, Quebec, Canada, assignor to Northern Electric Company, Limited, Montreal, Quebec, Canada, a corporation of Canada Filed Feb. 4, 1957, Ser. No. 637,954

6 Claims. (Cl. 324—51)

This invention relates to indicating devices and more particularly to the apparatus for indicating the degree of the electrical continuity and the mutual capacitance with respect to circuit elements.

Due to the magnitude of the current employed it has been difficult in the past to make reliable tests for indicating electrical characteristics in circuit elements having a low resistance or capacitance characteristic without damaging the elements.

An object of this invention is to provide improved apparatus for indicating the degree of electrical continuity or capacitance in circuit elements.

A further object of this invention is to provide an improved apparatus for indicating the degree of electrical continuity or capacitance in circuit elements having a low resistance or capacitance characteristic without damage to the elements.

These and other objects of this invention are obtained by providing an electronic oscillator of the transistor type having negative and positive feedback means and controlling the resonance of the oscillator by including in the negative feedback means a high impedance circuit elements in combination with means to control its impedance in relation to the degree of continuity of or the mutual capacitance of the elements under test.

A better understanding may be obtained by referring to the following description, taken in conjunction with the single accompanying drawing, for one embodiment of the invention in which:

Considering the drawing, there is shown a grounded base transistor oscillator schematic circuit comprising a N–P–N junction transistor element 1 having a block 2, provided with a low resistance base electrode 3, emitter electrode 4 and collector electrode 5; the emitter electrode 4 is connected to the base electrode 3 by way of emitter resistance element 6, operating biasing battery 7, primary winding 8 of transformer 9, having a high impedance characteristic and shunted by resistor 10, base resistor 11, the collector electrode 5 is connected to base electrode 3 through primary windings 12, 13 of transformer 14, winding 12 having short circuiting switch 15 therearound, loudspeaking device 16, collector battery 17, windings 18, 19 constituting the secondary windings of transformer 14; positive feedback circuits which include capacitors 20 and 21, negative feedback circuit which includes resistor 23 adjustable by slider 24.

The secondary winding 25 of transformer 9 is connected to switch 26 having made contacts 27, contacts 28, 29 adapted to be connected to circuit element 30 under test; isolating capacitors 31, 32 are connected to terminals 33, 34 respectively, these terminals being adapted to be connected to the capacitance elements 35, 36 under test.

As is well known, when a transistor of the so-called grounded base configuration has its collector output current in phase with the emitter input current and the amplifier circuit is provided with feedbacks, when the output exceeds the emitter input current a predetermined amount, the circuit will oscillate depending on the alpha or current gain of the transistor amplifier, the amount of the positive feedbacks 5—22—21—4—2—5 and 5—12—13—20—4—5, the amount of the negative feedback 5—23—24—3—11—8—7—6—4—2—5. The gain of the transistor amplifier is adjusted by the insertion of resistor 11 of predetermined resistance value, the impedance of winding 8 of transformer 9 by resistor 10 of predetermined resistance value and the negative feedback by resistor 23 of adjustable resistance value.

By connecting a standard variable resistor to contacts 28, 29 of switch 26 with make contacts 27 open, to form a closed circuit 25—28—30—29—25 and switches 15 and 22 opened and closed respectively, the circuit may be made to oscillate within the range of the standard resistor depending on the parameters described heretofore. Winding 8 of transformer 9 is of high impedance in order that the oscillating circuit is sensitive to the oscillations within the stated range. The pitch of the oscillations thus created will vary from a high pitch at the highest point of resistance of the standard resistor to a low pitch at the lowest resistance value of this resistor. This variation in the pitch of the oscillations is due to the change in the resonance of the oscillating circuit by a change in the impedance of winding 8 of transformer 9 due to the action of the current flowing in the closed circuit 25—28—30—29—25. By replacing the standard resistor by a test circuit element 30 its degree of continuity may be determined by noting the pitch of the frequency of the oscillations in loudspeaker 16.

By connecting the standard resistor to terminals 28, 29 and adjusting the resistance of resistor 23, the cut off point where the oscillation of the circuit ceases may be set. The device will therefore distinguish if the impedance of the circuit element 30, substituted for the standard resistor, is greater or smaller than a predetermined impedance to which the device has been set by noting the pitch of the frequency of the oscillations in the loudspeaking device 16.

In the operation of the apparatus for determining the degree of the mutual capacitance between circuit elements under test it is necessary to adjust the parameters of the oscillating circuit due to the capacitance introduced into the circuit by the test circuit elements. In this operation, with make contacts 27 in the closed position and the total resistance of resistor 23 in the circuit, switches 15 and 22 are closed and opened respectively reducing the capacitance and inductance of the oscillating circuit. If a standard variable capacitor of a predetermined range is connected to terminals 33, 34 the circuit may be made to oscillate over this range, by adjusting resistance of resistor 23 so as to increase the current flowing in the negative feedback circuit 5—23—24—11—8—7—6—4—2—5. This condition is aided by a shift in the operating biasing point of the collector due to the base 3 becoming more positive in view of the decrease in the resistance of resistor 23. The magnitude of the current flowing in the feedback circuit 5—23—24—11—8—7—6—4—2—5 will be a function of the phase shift in this circuit introduced by the variable capacitor, this circuit in conjunction with the closed circuit 25—28—27—25, establishing the pitch of the oscillating circuit as described heretofore. If the test circuit elements are substituted for the variable capacitor, the degree of mutual capacitance between these elements may be ascertained.

What is claimed is:

1. A device for obtaining the degree of electrical continuity of and the mutual capacitance between circuit elements comprising in combination: an oscillating circuit comprising a semi-conducting material having a low resistance base electrode, an emitter and a collector electrode with means for applying negative operating potential to the base and emitter electrodes and a positive potential to the collector electrode; a positive feedback circuit means interconnected between the emitter and collector electrodes and a negative feedback circuit connected between the emitter and base electrodes and between the base and collector electrodes, a high impedance included in the negative feedback circuit means connected between the base and emitter electrodes, closed circuit means, adapted to include or exclude a circuit element, in inductive relation with the high impedance means; an adjustable resistor included in the negative feedback circuit connected between the collector and base electrode; means to include or exclude capacitance circuit elements in parallel relation with the adjustable resistor; means included in the oscillating circuit for audible discrimination of changes of the frequency of the oscillations.

2. A device in accordance with claim 1 in which said positive feedback circuit means comprises a pair of feedback circuits with means to disable one of the feedbacks and to reduce the magnitude of the feedback of the other.

3. A device in accordance with claim 1 in which said capacitance circuit elements comprise the capacitor under test and an isolating capacitor disposed on each side thereof.

4. An adjustable oscillating device comprising in combination: a semiconducting material having a low resistance base electrode, an emitter and a collector electrode with means for applying negative operating potential to the base and emitter electrodes and a positive potential to the collector electrode; a positive feedback circuit means interconnected between the emitter and collector electrodes and a negative feedback connected between the emitter and base electrodes and between the base and collector electrodes; a high impedance included in the negative feedback circuit means and connected between the base and emitter electrodes, a closed circuit means in inductive relation with the high impedance, means for varying the current induced in the closed circuit means.

5. A device for obtaining the degree of electrical continuity of circuit elements comprising in combination: an electronic oscillating circuit comprising a semiconducting material having a low resistance base electrode, an emitter and a collector electrode with means for applying a negative operating potential to the base and emitter electrodes and a positive potential to the collector electrode; a positive feedback circuit means interconnected between the emitter and collector electrodes; and a negative feedback circuit connected between the emitter and base electrodes and between the base and collector electrodes, a high impedance, included in the negative feedback circuit means, connected between the base and emitter electrodes, closed circuit means, adapted to include or exclude a circuit element, in inductive relation with the high impedance means; means included in the oscillating circuit for audible discrimination of the impedances of the circuit element by the changes of frequency of the oscillations.

6. A device in accordance with claim 5 having in combination therewith means included in the said negative feedback circuit means; connected between the collector and base electrodes adapted to adjust the magnitude of the said negative feedback means.

References Cited in the file of this patent

UNITED STATES PATENTS

| | | |
|---|---|---|
| 2,104,441 | Stratford | Jan. 4, 1938 |
| 2,697,203 | Shepard | Dec. 14, 1954 |
| 2,724,798 | Hare | Nov. 22, 1955 |

OTHER REFERENCES

Queen: Radio Electronics, March 1955, pages 106, 108 and 110.

Rhita: "Radio-Electronics," February 1956, page 51.

Queen: Radio-Electronics, May 1956, pages 34–35.